United States Patent (10) Patent No.: US 7,079,266 B1
Rai et al. (45) Date of Patent: Jul. 18, 2006

(54) PRINTSHOP RESOURCE OPTIMIZATION VIA THE USE OF AUTONOMOUS CELLS

(75) Inventors: Sudhendu Rai, Fairport, NY (US); Ashok V. Godambe, Pittsford, NY (US); Charles B. Duke, Webster, NY (US); Guy H. Williams, Webster, NY (US)

(73) Assignee: Xerox Corporation, Stamford, CT (US)

( * ) Notice: Subject to any disclaimer, the term of this patent is extended or adjusted under 35 U.S.C. 154(b) by 887 days.

(21) Appl. No.: 09/706,430

(22) Filed: Nov. 3, 2000

(51) Int. Cl.
*G06F 15/00* (2006.01)
*G06K 1/00* (2006.01)

(52) U.S. Cl. ............... 358/1.13; 358/1.9; 358/1.15; 705/8

(58) Field of Classification Search ............ 358/1.13, 358/1.15, 1.1, 1.14, 1.16, 1.11, 1.9, 1.12; 705/8, 9; 718/102, 104, 106
See application file for complete search history.

(56) References Cited

U.S. PATENT DOCUMENTS

| 4,887,218 A | 12/1989 | Natarajan ............ 700/102 |
| 4,896,269 A | 1/1990 | Tong ............... 700/101 |
| 4,956,784 A | 9/1990 | Hadavi et al. ............ 700/102 |
| 4,974,166 A | 11/1990 | Maney et al. ............ 700/113 |
| 5,093,794 A | 3/1992 | Howie et al. ............ 700/100 |
| 5,229,948 A | 7/1993 | Wei et al. ............ 700/99 |
| 5,287,194 A * | 2/1994 | Lobiondo ............ 358/296 |
| 5,918,226 A | 6/1999 | Tarumi et al. ............ 707/10 |
| 5,946,661 A | 8/1999 | Rothschild et al. ............ 705/7 |
| 5,978,560 A | 11/1999 | Tan et al. |
| 6,263,253 B1 | 7/2001 | Yang et al. ............ 700/99 |
| 6,278,901 B1 | 8/2001 | Winner et al. ............ 700/99 |
| 6,293,714 B1 | 9/2001 | Noda |
| 6,348,971 B1 * | 2/2002 | Owa et al. ............ 358/1.15 |
| 6,509,974 B1 | 1/2003 | Hansen |
| 6,546,364 B1 * | 4/2003 | Smirnov et al. ............ 703/22 |
| 6,650,431 B1 | 11/2003 | Roberts et al. |
| 6,728,947 B1 | 4/2004 | Bengston |
| 2001/0052995 A1 * | 12/2001 | Idehara ............ 358/1.15 |
| 2002/0101604 A1 | 8/2002 | Mima et al. |

FOREIGN PATENT DOCUMENTS

JP 11296333 A * 10/1999

OTHER PUBLICATIONS

U.S. Appl. No. 09/706,078, filed Nov. 3, 2000, Squires et al.
U.S. Appl. No. 09/767,976, filed Jan. 23, 2001, Rai et al.

(Continued)

*Primary Examiner*—Gabriel Garcia
*Assistant Examiner*—Thierry Pham
(74) *Attorney, Agent, or Firm*—Fay, Sharpe, Fagan, Minnich & McKee, LLP

(57) ABSTRACT

A printshop contains resources that are utilized to complete print jobs. The resources are partitioned into autonomous cells. Each autonomous cell is capable of completing at least one class of print job. Print jobs are assigned to the autonomous cells for completion. An autonomous cell may subdivide a print job into smaller sized lots and process the smaller size lots in parallel. This approach enhances the efficiency of the shop, decreases the work in progress, labor and inventory costs associated with running the print jobs and increases the utilization of the printing equipment in the printshop.

26 Claims, 7 Drawing Sheets

OTHER PUBLICATIONS

U.S. Appl. No. 09/735,167, filed Dec. 12, 2000, Jackson et al.

U.S. Appl. No. 09/771,740, filed Jan. 29, 2001, Garstein.

Hopp, Wallace J. and Spearman, Mark L., *Factory Physics: Foundations of Manufacturing Management*. McGraw-Hill Professional Book Group, Boston, Massachusetts. ISBN: 0-256-15464-3; pp. 153-156; 323-325; 462-485 (Sep. 1995).

Luqi, et al., a Prototyping Language for Real-Time Software. *IEEE Transactions on Software Engineering*, vol. 14, No. 10, Oct. 1988, pp. 1409-1423.

*ADF or LDF? Introducing the Lean Document Factory I*, Xerox Corporation, Power Point Presentation, Nov. 4, 1999.

*ADF or LDF? Introducing the Lean Document Factory II*, Xerox Corporation, Power Point Presentation, Nov. 4, 1999.

Rai, Sudhendu, Xerox Corporation, *Print Shops as Document Factories, The Future of Manufacturing: New Developments in Technology and System Design*; Massachusetts Institute of Technology; Power Point Presentation, Apr. 19, 2000, pp. 1-18.

Gershwin, Stanley and Rai, Sudhendu, *Application and Extension of Manufacturing Systems Engineering Techniques to Print Shops*; Dept. of Mechanical Engineering, Massachusetts Institute of Technology, and Wilson Center for Research Technology, Xerox Corporation; Power Point Presentation; Sep. 29, 1999, pp. 1-15.

Gershwin, Stanley B., *Manufacturing Systems Engineering*, Prentice-Hall, 1994.

*Cellular Manufacturing: One-Piece Flow for Workteams*, ISBN: 156327213X, Productivity Press Inc.; Apr. 1999.

Wu, N., *A Concurrent Approach to Cell Formation and Assignment of Identical Machines in Group Technology*, Int. J. Prod.. Res., 1998, vol. 36, No. 8, 2099-2114; Science Center, Shantou University, Shantou 515063, China.

\* cited by examiner

PRINTSHOP RESOURCE OPTIMIZATION VIA THE USE OF AUTONOMOUS CELLS

TECHNICAL FIELD OF THE INVENTION

The present invention relates generally to printing and more particularly to optimization of printshop resources via the use of autonomous cells.

BACKGROUND OF THE INVENTION

Conventional printshops are organized in a fashion that is functionally independent of print job complexity, print job mix, and total volume of print jobs. Typically, related equipment is grouped together. Thus, all printing equipment is grouped and located in a single locale. Similarly, all finishing equipment is grouped and located in a single locale. In other words, conventional printshops organize resources into separate departments, where each department corresponds to a type of process or operation that is performed to complete a print job.

When a print job arrives from a customer, the print job sequentially passes through each department. Once the print job is completely processed by a first department, the print job gets queued for the next department. This approach continues until the print job is completed. Unfortunately, this conventional approach leads to significant time delays and increased work-in-progress and inventory costs.

SUMMARY OF THE INVENTION

The present invention addresses the above-described limitations. In accordance with one embodiment of the present invention, a printshop is partitioned into autonomous cells. In addition, print jobs are partitioned into classes such that each autonomous cell contains sufficient resources to complete a print job of at least one class. Thus, for example, an autonomous cell may include equipment, such as multiple printers, a shrink wrapper and a computerized control system. A second autonomous cell may include different varieties of printers, cutters and copiers. The present invention intelligently divides the resources into autonomous cells and then assigns print jobs to the autonomous cells.

The assignment of print jobs to autonomous cells is done intelligently to provide desired load balancing and throughput. Moreover, print jobs are assigned to cells based on whether the cells have sufficient types of resource to complete the print job. The assignment of print jobs to the autonomous cells may be determined dynamically based upon the current queue of print jobs, current available capacity and current operating loads of the respective autonomous cells. The structure and composition of the cells themselves may be determined dynamically based upon the profile of jobs to be performed by the printshop at any given time.

In accordance with one aspect of the present invention, a method is practiced in a printshop having resources for performing various tasks. The resources are divided into autonomous cells, where each autonomous cell has sufficient resources to produce one or more classes of print job. Each print job is assigned to one of the cells for printing.

In accordance with another aspect of the present invention, a printshop is partitioned into autonomous cells, and a print job is received for printing at the printshop. The print job is sent to a selected one of the autonomous cells that has equipment for completing the print job. Alternatively, the print job may be divided into lots and the lots are concurrently processed either on separate items of equipment in the selected autonomous cell or in separate cells.

In accordance with another aspect of the present invention, a method is practiced for partitioning a printshop into autonomous cells. Products that are to be produced by the printshop are identified, and the operations required for each of the identified products are specified. A determination is made to specify the printshop resources that are received or required for the identified operations. A determination is also made to specify the printshop resources that are required for operations to produce the product based on customer demand for the products. The printshop resources are partitioned into autonomous cells based on the determined number of printshop resources required for operations to produce products based on customer demand for products. Each autonomous cell is independently capable of producing at least one of the identified products. This partition is re-examined and re-optimized repeatedly as the customer demand for products changes.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides an approach to partitioning resources in a printshop efficiently so as to optimize performance of the printshop. Printshop resources, such as printers, copiers, cutters, shrinkwrappers and other varieties of equipment, are partitioned into autonomous cells. When a print job arrives, it is assigned to a particular autonomous cell for completion. Each autonomous cell may act independently from the other autonomous cells in processing a print job. Print jobs may be partitioned into smaller-sized lots that are concurrently processed by autonomous cells in order to optimize the efficiency and throughput of each autonomous cell. Moreover, multiple print jobs may be processed concurrently by an autonomous cell, and multiple print jobs may be executed concurrently by multiple autonomous cells in parallel.

Figure 1:
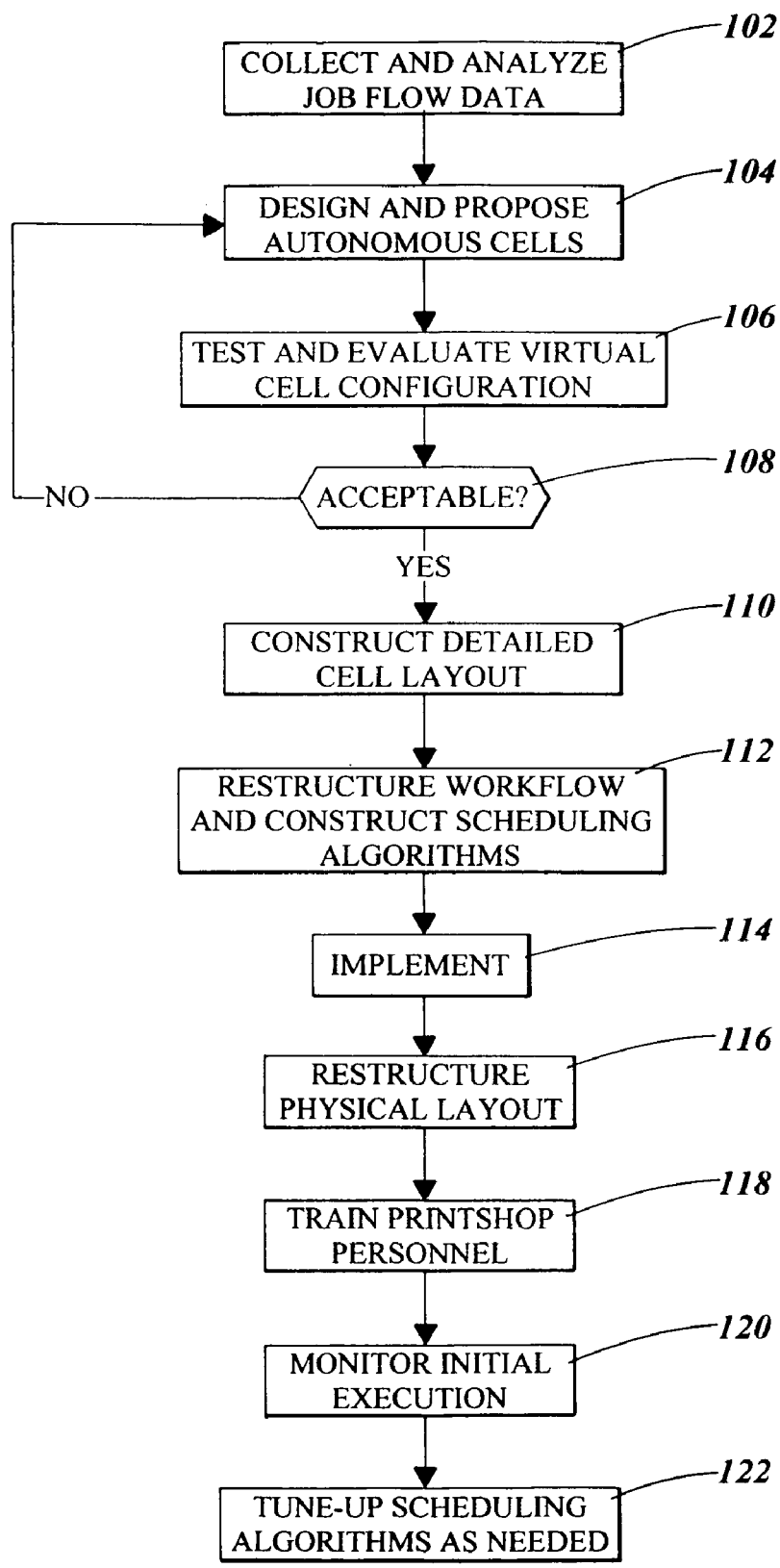
FIG. 1 is a flow chart that provides an overview of steps that are performed in the illustrative embodiment of the present invention.

Printshop resources are intelligently divided into autonomous cells. An analysis is made of print jobs that are typically performed by a printshop. Each type of print job is classified into a print job class according to the resources required to execute it. A print job class may be depicted graphically as a set of operations that are connected by edges representing the sequence of flow of operations in the print job. The capacity of each of the pieces of equipment in the printshop to perform operation is determined. The capacity for each print job class needed to meet the customer requirements is determined. The printshop resources may then be organized into autonomous cells and used during operation in an optimal fashion FIG. 1 shows a flow chart that provides an overview of steps performed in the illustrative embodiment of the present invention. Initially, the expected job flow in a printshop is collected and analyzed to determine the types ("classes") of jobs to be performed and the number of each per unit time (step 102 in FIG. 1). The printshop is analyzed to design and propose autonomous cells into which the printshop resources may be divided so as to optimize the flow of jobs through the shop (step 104 in FIG. 1). Each autonomous cell represents a grouping of one or more resources in the printshop that is capable of executing at least one class of print job. The autonomous cell may be able to complete the execution of multiple classes of print jobs or even all of the classes of print jobs. The partitioning of the resources into autonomous cells will be described in more detail below. A "printshop," as used herein, refers to a grouping of resources used in completing a print job. A printshop may be part of a corporation, a free-standing shop, or other variety of organization.

Once the printshop resources have been divided into proposed autonomous cells, the proposed "virtual" cell configuration is tested and evaluated (step 106 in FIG. 1). This testing and evaluation helps to ensure that the virtual cell configuration works well and produces acceptable results. If the proposed virtual cell configuration does not produce acceptable results (see step 108 in FIG. 1), the above-described process repeats again beginning with step 104 so as to design and propose new autonomous cells.

If the results are acceptable (see step 108 in FIG. 1), then a detailed cell layout is constructed (step 110 in FIG. 1). The workflow within the print job is restructured to correspond with the cell layout. Scheduling algorithms are then constructed as well (step 112 in FIG. 1). Once this is completed, the use of the autonomous cells becomes formally implemented (step 114 in FIG. 1). The physical layout of the printshop may be restructured to account for the autonomous cells (step 116 in FIG. 1).

In order to facilitate proper operation of the printshop to account for the use of autonomous cells, printshop personnel must be properly trained (step 118 in FIG. 1). The printshop personnel must perform necessary tasks and must understand how the cells operate. The initial execution within the printshop is monitored to ensure that performance is acceptable (step 120 in FIG. 1). The scheduling algorithms may be tuned up to produce more optimal results in the response to the monitoring (step 122 in FIG. 1).

Figure 2:
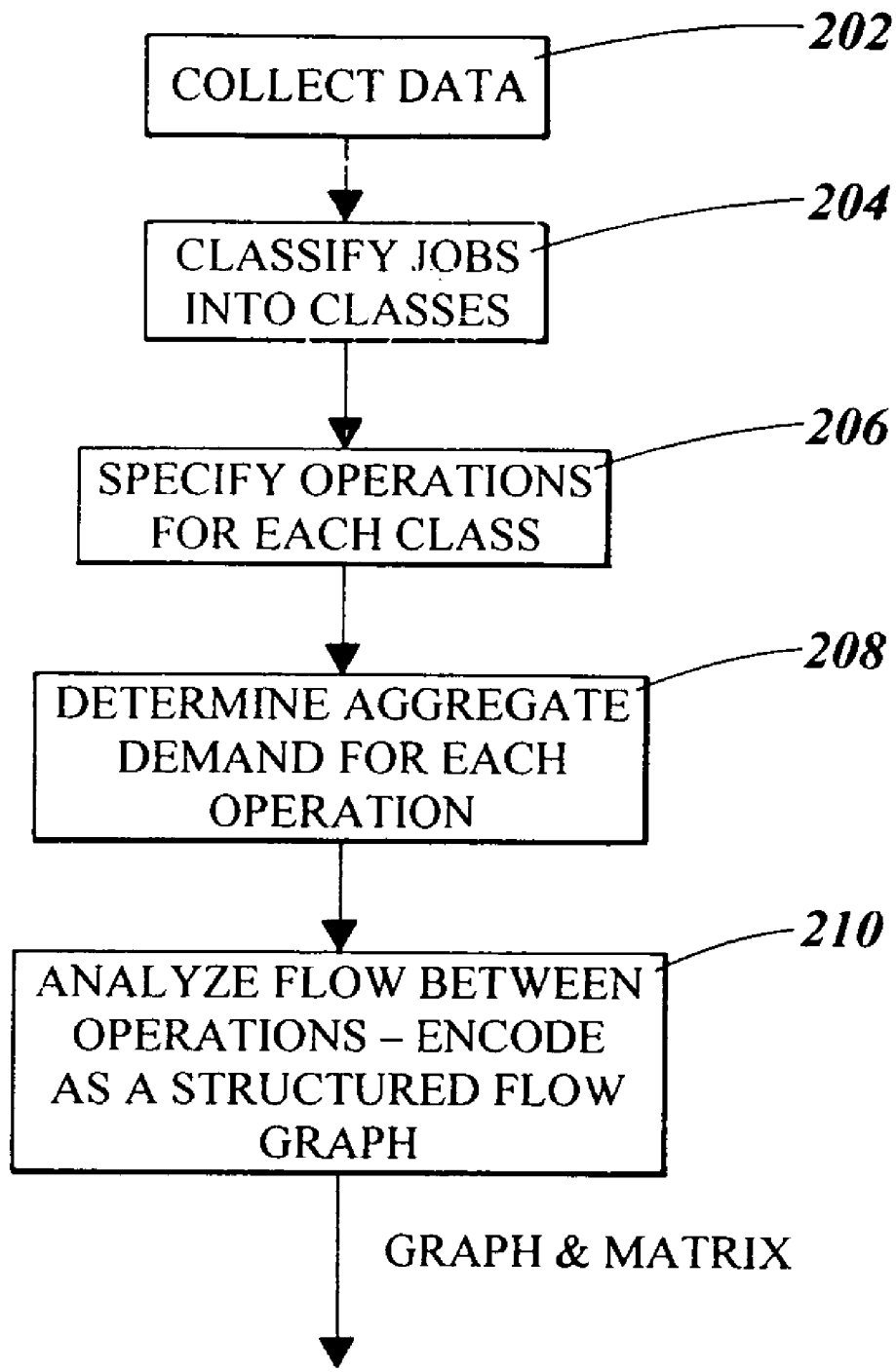
FIG. 2 is a flow chart that illustrates the steps that are performed to generate a graphical representation of job flow.

FIG. 2 is a flow chart illustrating steps that are performed to produce a graphical representation of the job flow in the printshop. This job flow depicts operations performed by resources in the printshop. Printshop resources include equipment, such as printers, copiers, rollers, shrinkwrappers, sealers and other varieties of equipment that are typically used to complete a print job. Those skilled in the art will appreciate that a wide variety of different types of equipment may be categorized as printshop resources, being included within autonomous cells in the illustrative embodiment. For example, manual resources may be partitioned as part of an autonomous cell.

In the illustrative embodiment of the present invention, the partitioning of the printshop into autonomous cells relies upon empirical data. The empirical data is gathered over a period of time, such as a few months or years, to identify the varieties of print jobs that are performed on the behalf of customers at a printshop (step 202 in FIG. 2). The print jobs may be classified into print job classes. For example, the print job classes may be print-insert, print and self-mail, and print and shrink wrap. Each print job class represents a sequence of operations that need to be performed by printshop resources to complete a print job of the specified class. Thus, print jobs that require the exact same sequence of operations are classified into the same printshop class. Accordingly, a first step is to classify the empirically-derived data regarding print jobs so that each of the print jobs is classified into one of the given print job classes (Step 204 in FIG. 2). Operations are determined for each print job class (step 206 in FIG. 2). In other words, the operations that are performed for print jobs of the print job class are identified. Then, the aggregate demand for each operation is determined from the empirical data (step 208 in FIG. 2).

Figure 3:
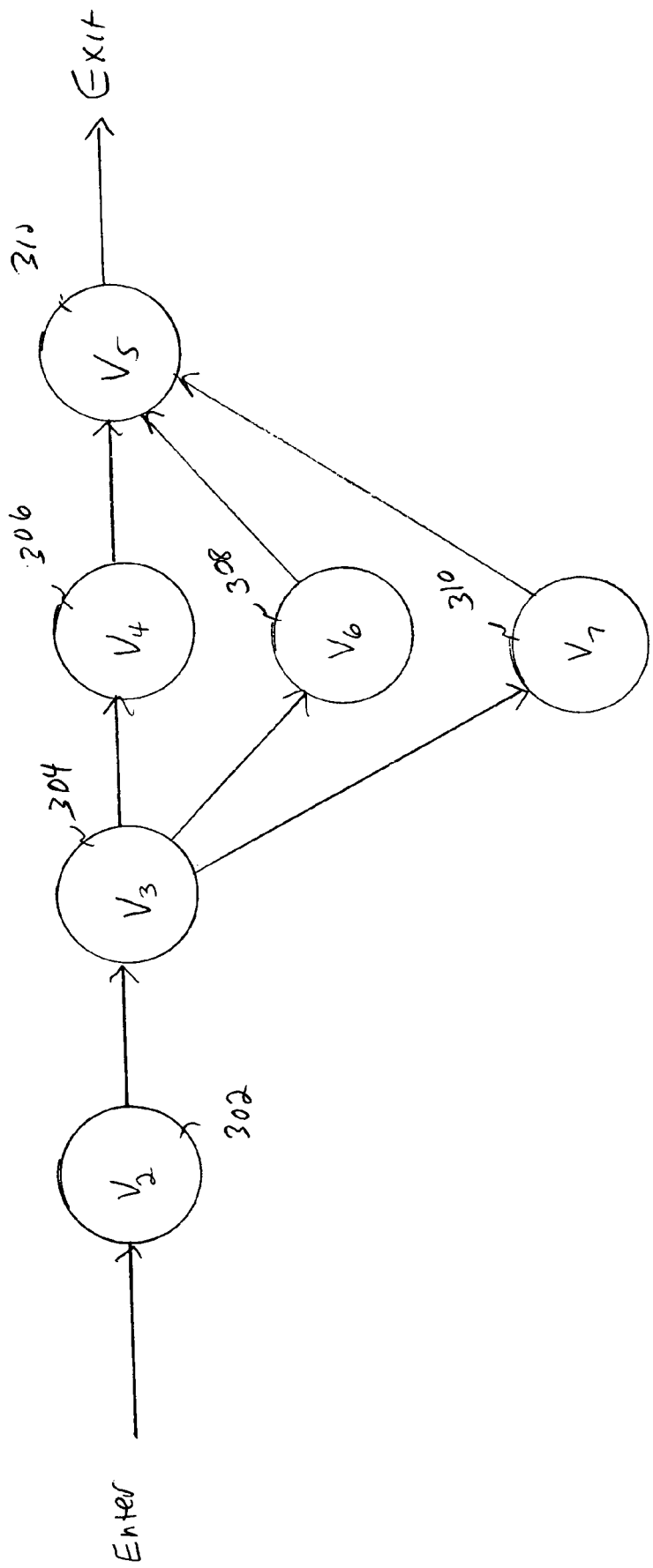
FIG. 3 is an example of a graphical representation of printshop resources in accordance with the illustrative embodiment.

A graphical representation of each print job class is developed by analyzing the flow between operations (step 210 in FIG. 2). In particular, each print job operation is represented as a node and each edge constitutes a transition from one operation to a next that is required for a variety of print job class. FIG. 3 shows an example of such a graphical representation of three varieties of print job classes. A first print job class is represented by nodes 302, 304, 306 and 312. These nodes 302, 304, 306 and 312 and the associated edges specify a sequence of operations to be performed to complete a print job of the specified print job class. A second print job class is represented by nodes 302, 304, 308 and 312 and the associated edges interconnecting these nodes. A third and final print job class is represented by nodes 302, 304, 310 and 312 and the associated edges.

Figure 4:
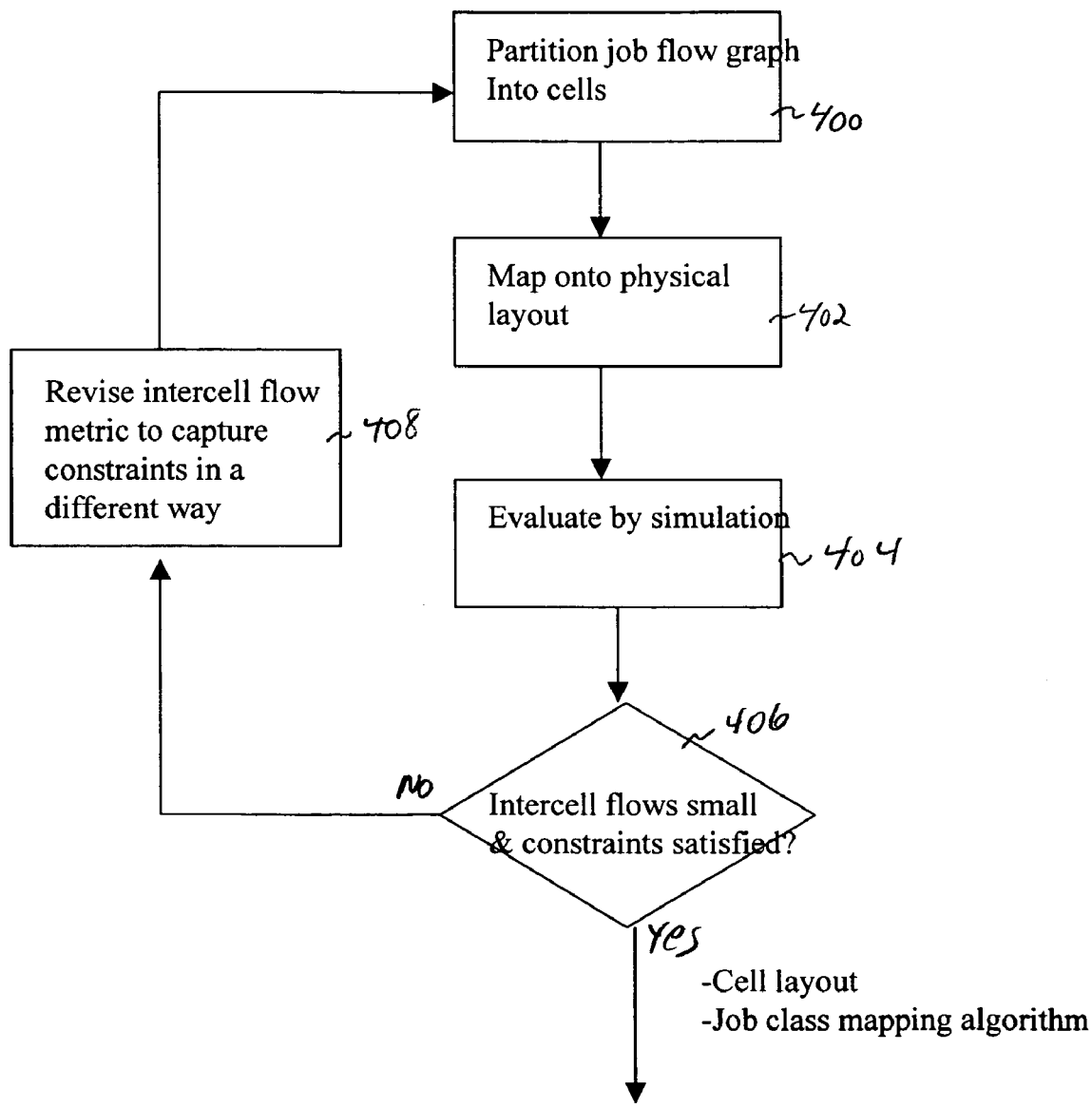
FIG. 4 is a flow chart that illustrates the steps that are performed to partition printshop resources into autonomous cells from the job flow representation.

FIG. 4 shows in more detail the steps that are performed to design and propose autonomous cells (see step 104 in FIG. 1). The job flow graph is partitioned into autonomous cells (step 400 in FIG. 4). A suitable form of graph partitioning algorithm for performing this partitioning is specified in, "A concurrent approach to cell formation and assignment of identical machines in group technology," N. Wu, International Journal of Production Research, 1998, Vol. 36, No. 8; 2099–2114. Those skilled in the art will appreciate that the cells may also be partitioned using other techniques. The autonomous cells that result from the partitioning of the job flow graph are then mapped onto the physical layout of the printshop (step 402 in FIG. 4).

Figure 5:
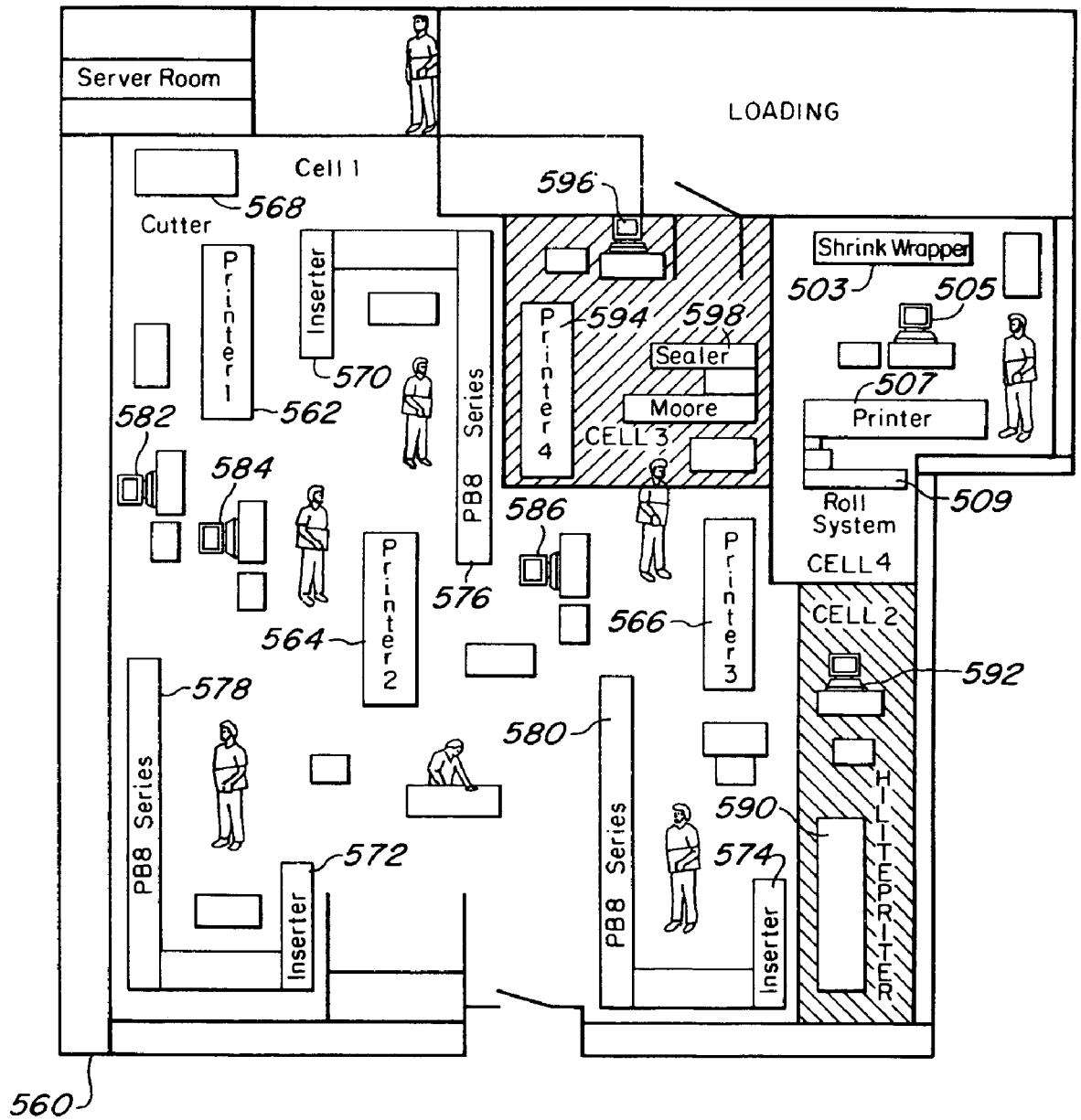
FIG. 5 is a diagram depicting how a printshop is partitioned into four autonomous cells.

FIG. 5 shows an example of the partitioning of a printshop into autonomous cells. The printshop 560 shown in FIG. 4 is partitioned into four cells numbered 1 through 4. Cell 1 includes printers 562, 564 and 566 and copiers 576, 578 and 580. Each of the copiers has an attached inserter 570, 572 and 574. A cutter 568 is also included in cell 1, as are computing resources 582, 584 and 586. The computing resources may include server computers that execute software for automatically assigning print jobs to given cells and for processing print jobs once they have arrived in given cells. Moreover, the computing resources 582, 584 and 586 may provide the ability of operators to control operation of the equipment within the cell.

Cell 2 includes a computer system 592 and a highlight printer 590. Cell 3 includes a printer 594 as well as a sealer 598 and computer system 596. Lastly, cell 4 includes a shrink wrapper 503, a computer system 505, a printer 507 and a roll system 509.

The resulting partitioning and mapping of autonomous cells is evaluated by computer simulation (step 404 in FIG. 4). The computer simulation attempts to simulate real-time printshop operation conditions. Certain constraints may be placed upon the autonomous cells. In step 406 of FIG. 4, a determination made whether the constraints have been satisfied and whether the flow of operations between autonomous cells is minimal. In general, a cell should be self-contained such that there is no need for a cell to communicate with another cell in order to complete a print job. If the inter-cell flows are small and the constraints are satisfied (see step 406 in FIG. 4), the resulting cell layout and job class mapping algorithm are utilized. On the other hand, if the inter-cell flows are not small and the constraints are not satisfied, the inter-cell flow metric is revised to capture constraints in a different way (step 408 in FIG. 4).

Figure 6:
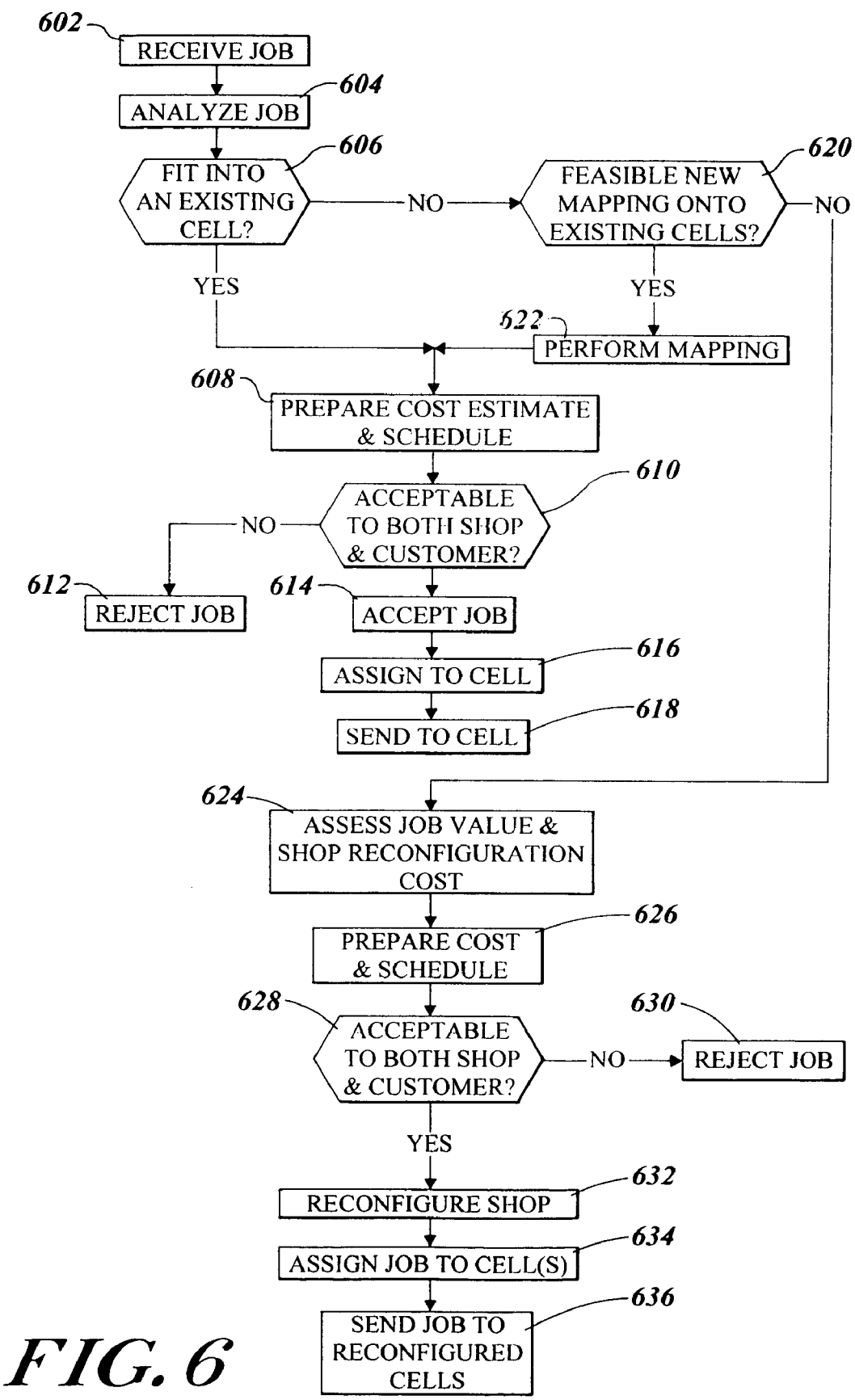
FIG. 6 is a flow chart illustrating the steps that are performed to determine whether to reconfigure the autonomous cells of a printshop.

FIG. 6 is a flow chart illustrating the steps that are performed when a print job is received in a printshop that has been organized into autonomous cells. Initially, a print job is received at the shop (Step 602 in FIG. 6). The submission of the print job may be performed by a customer walking into the printshop and making a verbal request for a print job. Alternatively, the print job may be received electronically. The specification of the print job identifies the tasks that are to be performed to complete the print job. This specification may also identify the timing required of the print job and particular features that are to be incorporated into the print job, such as type of printing to be used, type of stock to be used, whether binding is to be used and the like. The print job is analyzed to identify the operations that it requires and the quantity of operations that are required by the job (step 604 in FIG. 6). A determination is made whether the print job can fit into an existing cell (step 606 in FIG. 6). If the print job will fit into an existing cell, a cost estimate and a schedule for printing the print job are prepared (step 608 in FIG. 6). If the cost and the schedule are acceptable to both the printshop and the customer (step 610 in FIG. 6), the job is accepted (step 614 in FIG. 6). If they are not acceptable to the printshop and/or the customer, the print job is rejected (step 612 in FIG. 6). If the print job is accepted, it is assigned to an autonomous cell (step 616 in FIG. 6) and subsequently sent to the autonomous cell (step 618 in FIG. 6).

If in step 606 of FIG. 6 it is determined that the print job does not fit into an existing cell, a determination is made whether it is feasible to have a new mapping onto the existing cells (step 620 in FIG. 6). If it is feasible, such a mapping is performed so as to use existing cells (step 622 in FIG. 6). If it is not feasible to map the print job onto the existing cells using a different mapping, an assessment of the print job value is made and an assessment is made of the reconfiguration cost which would be associated with reconfiguring the autonomous cells (step 624 in FIG. 6). A cost estimate and schedule are prepared for performing the job in the reconfigured printshop (step 626 in FIG. 6). If the cost and schedule are not acceptable to both the printshop and the customer (see step 628 in FIG. 6), the print job is rejected (step 630 in FIG. 6). In contrast, if the cost and schedule are acceptable to both the print job and to the customer, the printshop is reconfigured (step 632 in FIG. 6). In particular, a new mapping of autonomous cells is generated. The print job is then assigned to one of the cells (step 634 in FIG. 6) and sent to the associated cells (step 636 in FIG. 6).

Figure 7:
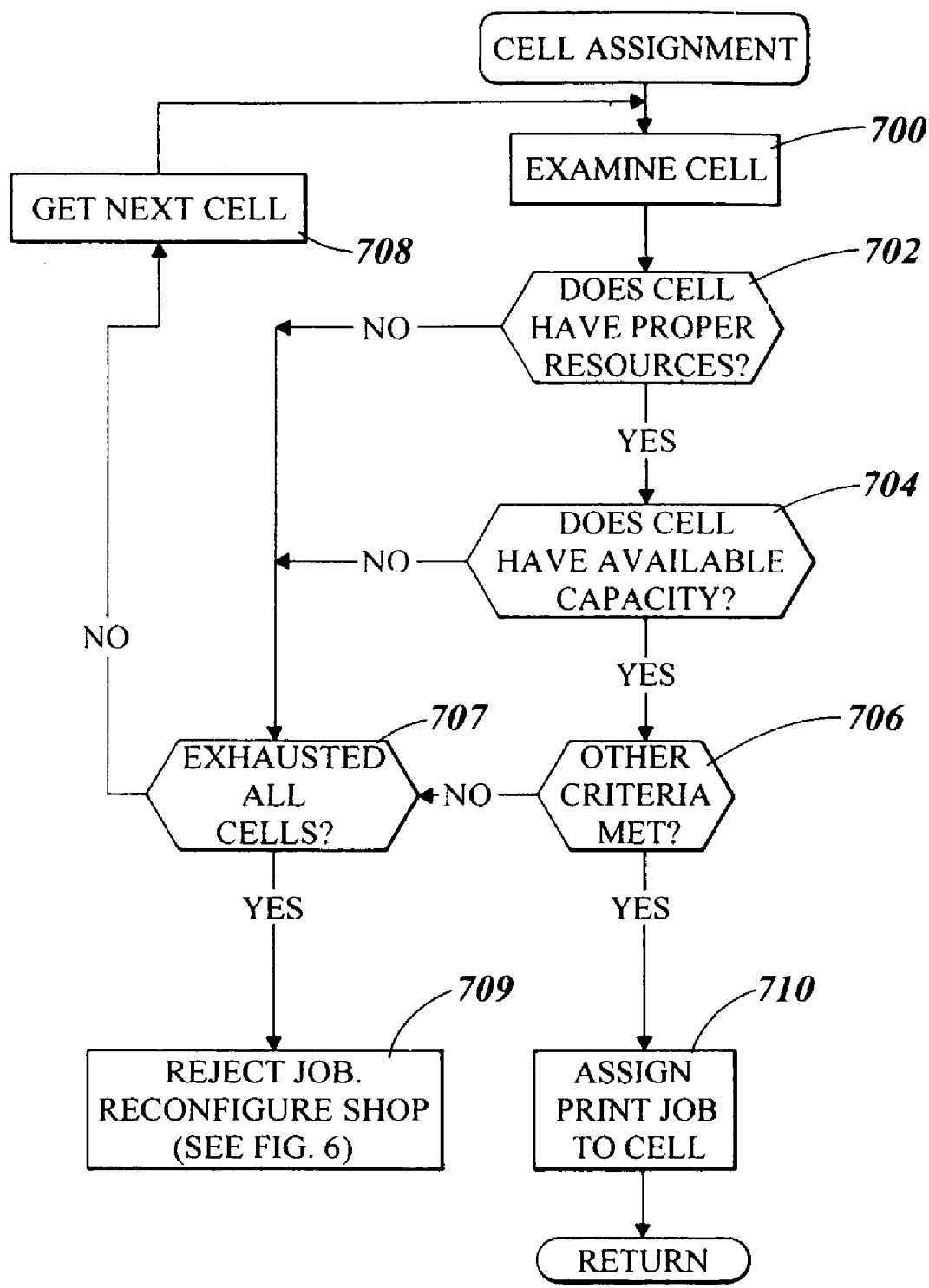
FIG. 7 is a flow chart illustrating steps that are performed in determining whether to assign a print job to a particular autonomous cell in the illustrative embodiment.

A number of different criteria may be applied to determine which autonomous cell to assign to a received print job. FIG. 7 provides a flow chart illustrating an approach as adopted by the illustrative embodiment to the present invention. The cells may be examined in a predefined sequence, such as a round robin sequence or based upon utilization. For example, the process depicted in FIG. 7 may initially begin with the least busy cell and continue with successively more busy cells until a suitable cell is found for processing the print job. Thus, initially, the cell of interest is examined (step 700 in FIG. 7). First, a determination is made whether the cell has the proper resources for completing the print job (step 702 in FIG. 7). For example, if a print job requires shrinkwrapping in the shop described in FIG. 5 then cell 4 is used. Only cell 4 has a shrinkwrapper, and, thus, cells 1, 2 and 3 do not have the proper resources for completing the print job. A test may then be made whether the cell has sufficient available capacity to complete the print job within specified time requirements (step 704 in FIG. 7). If a cell does not have enough capacity to print the print job in a timely fashion, then the cell may not be utilized to complete the print job. Those skilled in the art will appreciate that other criteria may also be applied (see step 706 in FIG. 7) to determine whether to assign a print job to a given cell or not. In cases where the examined cells can not be used, a next cell is then examined (step 708 in FIG. 7) until either it is validated that no suitable cell is available (step 707 in FIG. 7) or until a suitable cell is found. If a suitable cell is found, the print job is assigned to the examined cell (step 710 in FIG. 7). If no suitable cell can be found, the alternatives are examined as described in FIG. 6.

While the present invention has been described with reference to an illustrative embodiment thereof, those skilled in the art will appreciate that various changes in form and detail may be made without departing from the intended scope of the present invention as defined in the appended claims.

The invention claimed is:

1. In a printshop having resources for performing various tasks to process print jobs, a method for optimizing the performance of the printshop, the method comprising the steps of:
   partitioning the printshop into virtual autonomous cells, representing physical autonomous cells capable of receiving and processing print jobs;
   dividing the resources of the printshop between the virtual autonomous cells, wherein each virtual autonomous cell contains representations of sufficient resources to complete at least one class of print job, and wherein the virtual autonomous cells each contain a combination of resources, at least two of the resources of the combination of resources being necessary to complete the at least one class of print job;
   assigning each print job to a selected one of the virtual autonomous cells when the selected one of the virtual autonomous cells contains representations of a combination of resources capable of independently completing the print job; and
   mapping the print job onto a new mapping of the existing virtual autonomous cells when no existing virtual autonomous cell contains representations of a combination of resources capable of independently completing the print job.

2. The method of claim 1 wherein the resources include equipment for performing printing tasks and the resources include at least one of printers, copiers, rollers, shrink wrappers, cutters, sealers and manual resources, and each virtual autonomous cell includes a combination of at least two of the resources.

3. The method of claim 1 wherein the step of assigning print jobs comprises, for each given print job, determining what tasks need to be performed to complete the given print job and assigning the given print job to one of the virtual autonomous cells that contains sufficient representations of resources for performing the tasks that need to be completed to fully process the given print job.

4. The method of claim 3 wherein the step of assigning print jobs comprises, for each given print job, determining which of the virtual autonomous cells has sufficient available capacity to completely process the given print job.

5. The method of claim 1 wherein at least one of the virtual autonomous cells includes representations of more than one machine for performing a same operation.

6. The method of claim 1 further comprising the steps of:
determining classes of print jobs; and
assigning each print job to one of the classes.

7. The method of claim 6 wherein the determination of the class of print job is done based on collecting and analyzing print job data and on the tasks required to process the print job.

8. The method of claim 6 wherein the step of assigning each print job to a selected one of the virtual autonomous cells for processing is based in part on the classes to which the print jobs are assigned.

9. The method of claim 1 wherein a selected one of the virtual autonomous cells is assigned multiple print jobs for concurrently processing the multiple print jobs.

10. A method for optimizing the performance of a printshop, the method comprising the steps of:
providing a printshop that is partitioned into existing virtual autonomous cells, each virtual autonomous cell representing an autonomous cell, containing representations of sufficient resources to complete a print job;
receiving a print job for processing at the printshop;
determining if the print job fits at least one of the existing virtual autonomous cells, the fitted virtual autonomous cell including a combination of resources capable of completing the print job;
based on the determining, generating a new mapping of the virtual autonomous cells such that the print job fits at least one of the virtual autonomous cells of the new mapping;
sending the print job to a selected one of the virtual autonomous cells having the combination of resources capable of completing the print job, the selected one of the virtual autonomous cells being selected from one of the existing virtual autonomous cells or one of the virtual autonomous cells of the new mapping; and
at the selected virtual autonomous cell, dividing the print job into lots and concurrently processing the lots using the resources of the selected virtual autonomous cell.

11. The method of claim 10 wherein each virtual autonomous cell contains multiple resources for completing a print job.

12. The method of claim 10 wherein the printshop has more than two virtual autonomous cells.

13. The method of claim 10 wherein the lots are roughly equal sized.

14. The method of claim 10 wherein the dividing step is performed automatically by a machine.

15. The method of claim 14 wherein the machine is a computer system.

16. A method of partitioning a printshop, comprising the steps of:

identifying products produced by the printshop;
identifying operations required for producing each of the identified products;
determining printshop resources that are required for completing the identified operations;
determining a number of printshop resources required for operations to produce the products based on customer demand for products;
partitioning printshop resources into virtual autonomous cells based on the determined number of printshop resources required for operations to produce products based on customer demand for products, wherein each virtual autonomous cell represents autonomous cells, independently capable of producing at least one of the identified products, and wherein the virtual autonomous cells each contain a combination of printshop resources, at least two of the resources of the combination of printshop resources being necessary to produce at least one of the products; and
generating a new mapping of the virtual autonomous cells such that a new product fits at least one of the virtual autonomous cells of the new mapping based on the determined number of printshop resources required for the new product.

17. The method of claim 16 wherein throughput of each virtual autonomous cell is determined as a function of the printshop resources allocated to the autonomous cell, and wherein representations of the printshop resources are allocated to each virtual autonomous cell based on customer demand.

18. The method of claim 16 wherein the step of identifying products comprises identifying classes of print jobs produced by the printshop, wherein each class includes a sequence of operations that is performed to process the print jobs of the class that differs from the sequence of operations performed to process each of the other classes.

19. The method of claim 16 wherein customer demand is estimated based on empirical data.

20. The method of claim 16 further comprising the step of assigning a print job to a selected one of the autonomous cells for completion by the selected autonomous cell.

21. The method of claim 20 further comprising the step of dividing the print job into smaller sized lots and concurrently processing the smaller sized lots using the resources of the selected virtual autonomous cell.

22. The method of claim 20 wherein the assigning step is performed by a computer system.

23. The method of claim 1, further including constructing scheduling algorithms for the printshop based on the virtual autonomous cells.

24. The method of claim 1, further including altering a physical layout of the printshop in accordance with the virtual autonomous cells.

25. The method of claim 16, further including constructing scheduling algorithms for the printshop based on the virtual autonomous cells.

26. The method of claim 16, further including altering a physical layout of the printshop in accordance with the virtual autonomous cells.

* * * * *